United States Patent [19]

Paramythioti

[11] 3,998,287
[45] Dec. 21, 1976

[54] HYDROSTATIC TRANSMISSION VEHICLES

[75] Inventor: Michel Paramythioti, Chantilly, France

[73] Assignee: Albaret S.A., Rantigny, France

[22] Filed: Mar. 10, 1976

[21] Appl. No.: 665,532

[30] Foreign Application Priority Data

Mar. 12, 1975 France .............................. 75.07655

[52] U.S. Cl. ........................... 180/25 R; 180/26 A; 60/484; 60/486
[51] Int. Cl.² ........................................ B62D 61/08
[58] Field of Search ................. 180/6.24, 6.3, 6.32, 180/6.34, 6.48, 24.07, 25 R, 26 A, 66 R; 60/433, 484, 486

[56] References Cited
UNITED STATES PATENTS

| | | | |
|---|---|---|---|
| 2,942,677 | 6/1960 | Gray | 180/26 A |
| 3,362,493 | 1/1968 | Davis et al. | 180/6.32 |
| 3,550,708 | 12/1970 | Paramythioti | 180/6.48 |

*Primary Examiner*—Edgar W. Geoghegan
*Attorney, Agent, or Firm*—Diller, Brown, Ramik & Wight

[57] ABSTRACT

A hydrostatic transmission vehicle which is direction controlled by a speed controlled running assembly known as a motor-director running assembly and which has at least one further speed controlled driving running assembly. The motor-director running assembly is pivotable by means of a direction control system and its speed control system is coupled with that of each driving running assembly so that a speed which is coordinated with each driving running assembly is automatically applied to the motor-director running assembly when the vehicle is travelling in a straight line or turning.

10 Claims, 6 Drawing Figures

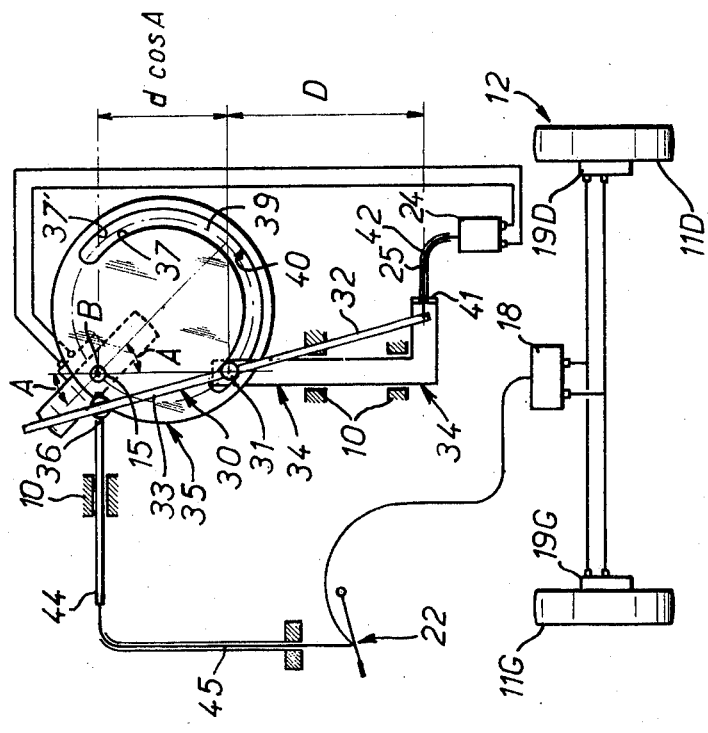

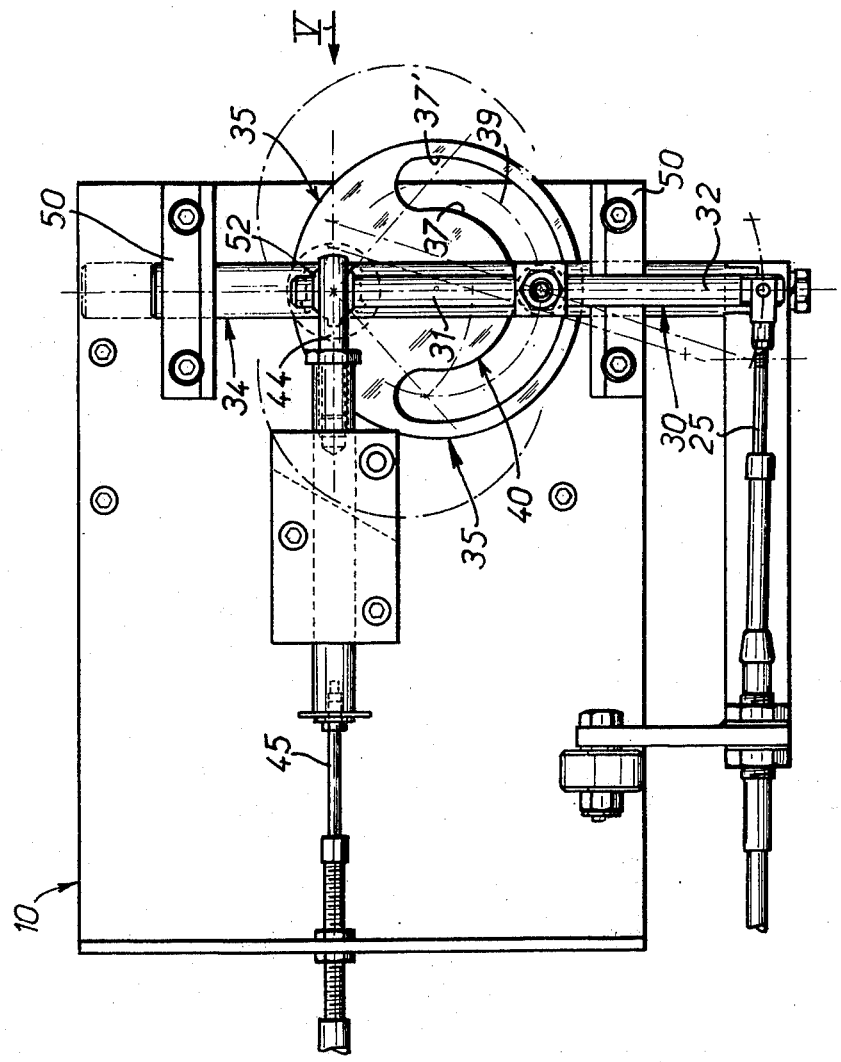
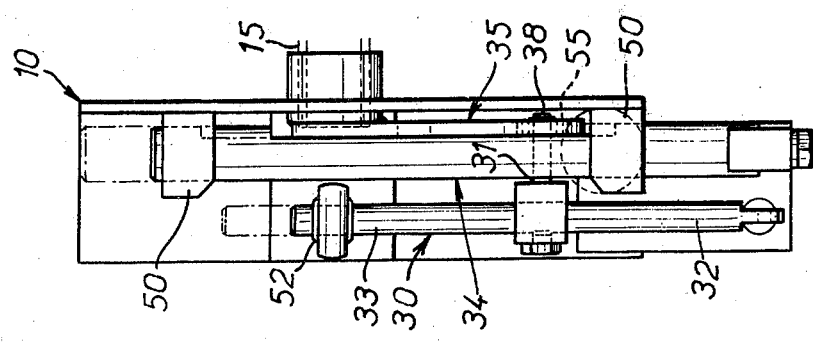

HYDROSTATIC TRANSMISSION VEHICLES

The present invention relates to vehicles with hydrostatic transmission.

FIELD OF THE INVENTION

The invention is particularly concerned with those vehicles in which the driving running elements are driven in rotation by hydraulic motors, with fixed cylinder displacement, supplied with fluid under pressure by one or more pumps having variable cylinder displacement.

As is the case for all these vehicles, the driving of such a vehicle with hydrostatic transmission requires the driver to control two essential control systems, namely a speed control system and a direction control system, which must be capable of being utilized independently of one another.

BACKGROUND AND SUMMARY OF THE INVENTION

In the case of hydrostatic transmission vehicles, the speed control is usually effected by a speed control lever by means of which it is possible to order a variation of cylinder displacement and thus output of the pump or pumps supplying fluid under pressure to the hydraulic motors which effect the rotation of the driving running elements, the rotation speed of each of these driving running elements being proportional to the delivery supplying its hydraulic motor.

As regards the direction control, it is in general effected either by simple steering of the director running assembly in relation to the driving running assembly, as is the case for ordinary automobile vehicles, or by differentiation of the speeds of the driving running elements of the driving running assembly, as is the case for track-laying vehicles.

A control of direction by steering of a director running assembly necessitates minimum weight on the latter; it further requires the utilization of differentials between the right and left driving running elements of the driving running assembly:

On the other hand it is very flexible to utilize, as this utilization can be effected by a hand wheel the control of which advantageously responds to the natural reflexes of a driver.

A control of direction by differentiation of speeds between the right and left driving running elements of the driving running assembly is itself applicable only to vehicles of very short wheel-base, unless considerable ground scrubbing is accepted; moreover its utilization, usually effected by levers, lacks flexibility and does not respond to the natural reflexes of a driver; finally in general in this case there is not total independence between the speed and direction control systems.

However in French Pat. No. 1,573,169 of the April 8, 1968 there was described a rocker lever control system for direction and speed of automobile vehicles with hydrostatic transmission, permitting speed control by differentiation of speeds between the right and left driving running elements of the driving running assembly of such a vehicle, advantageously with utilization by hand wheel and total independence between the speed and direction control systems.

The rocker lever device as described in the said patent advantageously in turning permits directional piloting of the director running assembly coordinated coherently with the different speeds imposed moreover upon the right and left running elements of the driving running assembly, in order to obtain such turning.

Thus to a certain extent it permits a positive piloting of a transverse differential.

However in the above-mentioned patent the running elements of the director running assembly are not driving elements.

The present invention has in general for object a hydrostatic transmission vehicle which is controlled in direction by steering of a director running assembly and the director running assembly of which is likewise a driving assembly, this running assembly therefore being hereinafter called motor-director.

As is well-known, this arrangement advantageously permits increasing the traction power of such a vehicle and imparting higher mobility capacity to it.

More precisely, the hydrostatic transmission vehicle according to the invention is thus of the kind which bears on the ground by at least two longitudinally staggered running assemblies, namely a driving running assembly which can be controlled in speed by a speed control system, and a motor-director running assembly which can be reduced to one single running element and which on the one hand is mounted to pivot as a whole about a steering spindle under the control of a direction control system, and on the other hand can also be controlled in speed under the control of a speed control system. The vehicle drive is characterised in that a coupling connection is established between the speed control system of the motor-director running assembly and the speed control system of the driving running assembly. This coupling connection includes a rocker lever mounted for pivoting and having on each side of its pivot on the one hand a first arm, hereinafter called constant arm, by which it is linked to any one of the speed control systems and the projection of which upon a median rest position corresponding to straight-ahead travel of the vehicle is substantially constant, and a second arm, hereinafter called a variable arm, by which it is linked to the other of the speed control systems and the projection of which upon the median rest position is variable under the control of the direction control system.

In practice, the pivot of the rocker lever is carried by a slider mounted for movement in a first direction under the control of a cam, and its variable arm cooperates, through the intermediary of supplementary engagement means, with a drum piece which is linked to the corresponding speed control and is guided in displacement in a second direction perpendicular to the first, the said cam, which is mounted for rotation about an axis perpendicular to the two said directions at the point of intersection thereof, being keyed in rotation on the direction control system and having a cam profile in contact with which a lug fast with the said slider and coaxial with the pivot thereof is held applied.

According to a first form of embodiment the director profile of this cam is a circle passing through its axis of rotation.

As variant this director profile is a straight line segment obtained by geometric inversion of the above circular director profile in relation to the point of this circular director profile through which the axis of rotation of the said cam passes.

Whichever is the case, the coupling connection provided according to the invention permits application to the motor-director running assembly of a speed coordinated with that of the driving running assembly, either in a straight line or in turning.

In fact it ensures a determined variable ratio between on the one part the action exerted directly upon the speed control system of the driving running assembly from the speed control lever which in practice is available for this purpose to the driver of the vehicle, and on the other part the action which it transmits to the speed control system of the motor-director running assembly, this ratio depending upon the steering angle imparted moreover by the said driver to the motor-director running assembly with the aid of the direction control system which is likewise available to him for this purpose, and ensuring coherence of the speed of the motordirector running assembly with that of the driving running assembly.

This coupling connection thus to a certain extent permits of ensuring a positive piloting of a longitudinal differential.

It is advantageously next conjugated with that described in the above-mentioned French Patent, which permits a positive piloting of a transverse differential.

All the driving running elements of a hydrostatic transmission vehicle according to the invention are thus advantageously piloted in mutually coherent fashion, both in orientation and in speed.

In such a case, all the forces developed on the ground by such a vehicle advantageously combine for the direction of the vehicle, so that there is no tendency to side-slip or crab by such a vehicle, whatever is the distribution of the loads among its various running elements.

BRIEF DESCRIPTION OF THE DRAWINGS

FIG. 2 is a plan view of such a vehicle equipped with the feature according to the invention, for straightahead driving of this vehicle, FIG. 3 is a view analogous with FIG. 2, for cornering of the vehicle concerned, FIG. 4 is a more detailed plan view of a particular form of embodiment of the coupling connection provided according to the invention between the speed control of the driving running assembly of such a vehicle and the rotation control of its motor-director running assembly, FIG. 5 is a lateral view of this coupling connection in the direction of the arrow V in FIG. 4.

DETAILED DESCRIPTION

Figure 1:
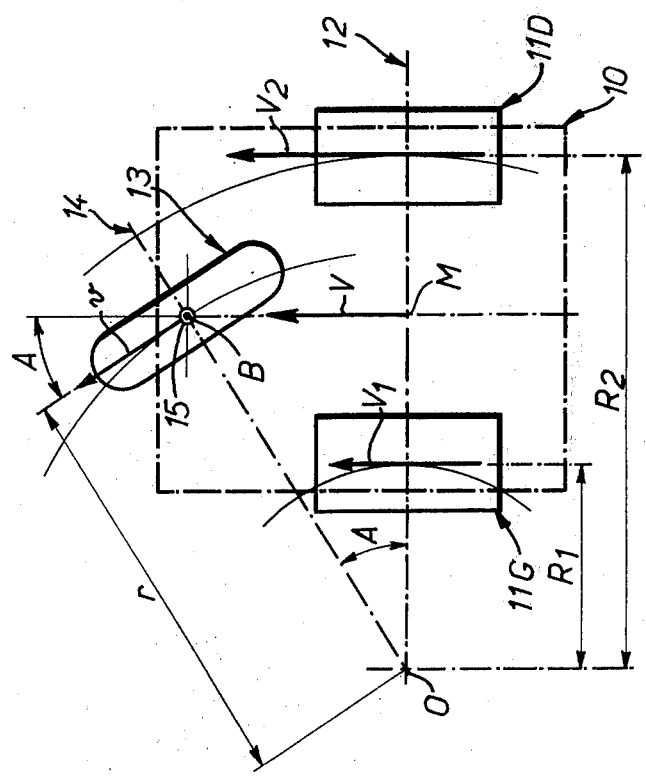
FIG. 1 is a plan view of a hydrostatic transmission vehicle to which the invention is applicable.

In FIG. 1, the hydrostatic transmission vehicle to which the invention is applicable is indicated diagrammatically only by the plan projection of its chassis 10, of the right and left driving running elements 11D, 11G of its driving running assembly 12 and of the running element 13 of its motor-director running assembly 14.

In the example as represented, the running element of the motor-director running assembly 14 is single and mounted for pivoting as a whole about a vertical steering spindle 15, the geometric axis of which has been marked by the reference B.

In turning, and in a manner known per se, the driving running elements 11D, 11G of the drive running assembly 12 are driven in rotation at different speeds, either by a conventional differential effect or advantageously in the manner as described in French Pat. No. 1,573,169 mentioned above.

Let V1 and V2 be the corresponding linear speeds at the ground the mean linear speed of the vehicle having the value V at the middle point M of its driving running assembly 12.

In turning, the vehicle describes an arc of a circle the centre of which is marked by the reference O; let A be the corresponding steering angle of the motor-director running assembly 14 and let R1 and R2 be the radii of the circles which the driving running elements 11D, 11G of the motor running assembly 12 then describe about the point O.

Further let $r$ be the radius of the circle described about the point O by the running element 13 of the motor-director running assembly 14, and $v$ be the linear ground speed of this running element.

In the triangle OBM there is the following relationship:
$$\overline{OM} = \overline{OB} \cdot \cos A$$
then:-

$$r = \frac{1}{\cos A} \cdot \frac{R1 + R2}{2}$$

So that the linear speed $v$ of the running element 13 of the steering running assembly 14 may be coherent, it is then necessary that:-

$$v = \frac{1}{\cos A} \cdot \frac{V1 + V2}{2} = \frac{1}{\cos A} \cdot V$$

The invention proposes that the running element 13 of the steering running assembly 14 of such a hydrostatic vehicle be driven in rotation with the aid of a hydraulic motor supplied with pressure fluid at a rate $c$ by a hydraulic pump of variable cylinder displacement, and that between this rate $c$ and the rates C1 and C2 of fluid under pressure further sent by the corresponding hydraulic pump or pumps to the hydraulic motors driving the rotation of the driving running elements 11D, 11G of the driving running assembly 12, the following relationship is to be expected:-

$$o = k \cdot \frac{1}{\cos A} \cdot \frac{C1 + C2}{2} \qquad (1)$$

More precisely, the present invention proposes an arrangement permitting the simple application this relationship, which ensures piloting at mutually coherent speeds of the various driving running elements of the hydrostatic transmission vehicle concerned, both straight-ahead and in cornering, as will appear hereinafter, $k$ being a simple proportionality factor suitably chosen as function of the constituents utilized.

FIGS. 2 and 3 concern the case, which is the most general case, where a single pump 18 alone effects the supply in parallel of fluid under pressure to the hydraulic motors 19D, 19G respectively effecting the rotation drive of the driving running elements 11D, 11G of the driving running assembly 12.

This single pump 18 so to speak acts as a differential, the fluid under pressure which it delivers being distributed of its own accord optimally between the hydraulic motors 19D, 19G which it supplies.

In a manner known per se, the cylinder displacement of this pump 18 can be varied under the control of a control handle (not detailed in the Figure) and the latter, for example through a cable 20, is linked to a lever 22 which is within the reach of the vehicle driver, and which is hereinafter called speed-control lever, or more generally speed-control system of the driving running assembly.

According to the invention, with the running element 13 of the motor-director running assembly 14 there is associated a hydraulic motor 23 supplied by a pump 24, and the control lever permitting varying the cylinder displacement of this pump is linked to a control cable 25 hereinafter called speed control of the motor-director running assembly 14, for greater simplicity.

According to the object of the invention, a coupling connection 26 is established between the speed control 25 of the motor-director running assembly 14 and the speed-control lever 22 constituting the speed control of the driving running assembly 12.

In general this coupling connection 26 essentially comprises a rocker lever 30 mounted to pivot about a pivot 31 and having on each side of this pivot 31, firstly a first arm 32 hereinafter called constant arm, by which it is linked to any one of the speed controls 22, 25 concerned and the projection of which upon a median rest position corresponding to straight-ahead travel of the vehicle is constant, and a second arm 33, hereinafter called variable arm, by which it is linked to the other of the said speed controls 22, 25 and the projection of which upon the said median rest position is variable under the control of the direction control system.

The median rest position to which reference is made here is that represented in solid lines in FIG. 2.

In practice the pivot 31 of the rocker lever 30 is carried by a slider 34 mounted for movement in a first direction D1 under the control of a cam 35, and the variable arm 33 of the rocker lever 30 cooperates, through the intermediary of supplementary engagement means, with a drum piece 36 linked to the speed control 22, 25, corresponding to this arm, which drum piece is guided in displacement in a second direction D2 perpendicular to the first, the said cam 35, which is mounted for rotation about an axis B perpendicular to the two directions D1, D2 at the point of intersection thereof, being keyed in rotation on the vehicle direction control, that is on the steering spindle 15 of the motor-director running assembly 14, by any appropriate transmission connection (not detailed in the Figures) and having a cam profile 37 in contact with which a guide lug 38 fast with the slider 34 and coaxial with the pivot 31 of the rocker lever 30 on the slider is kept applied.

In the example of embodiment as represented diagrammatically in FIGS. 2 and 3, the guide lug 38 of the slider 34 and the pivot 31 of the rocker lever 30 on the slider, represented in plan, coincide. The guide lug 38 can for example form a simple extension of the pivot 31.

The cam profile 37 of the cam 35 is an arc of a circle and the corresponding director profile 39, defined by the path followed by the geometric axis of the guide lug 38 when the latter follows the cam profile 37, is a circle passing through the axis B of rotation of the cam 35.

The cam profile 37 forms one of the flanks of a slot 40 which the cam 35 possesses and in which the guide lug 38 of the slider 34 is engaged, the other flank 37' of this slot forming in a manner known per se the means provided to maintain this guide lug 38 against the cam profile 37.

The slider 34 is guided by chassis elements 10 forming bearings.

The slider 34 laterally carries a right-angled branch 41.

The constant arm 32 of the rocker lever 30 constitutes the output element thereof, this arm being linked to the speed control 25 of the motor-director running assembly 14.

The sheath 42 of the speed control 25 is counter-abutted by the lateral arm 41 of the slider 34, this lateral arm at this level effecting a guidance of this speed control substantially perpendicularly to the slider 34.

The variable arm 33 of the rocker lever 30 constitutes its input element, this arm being linked to the speed control 22 of the driving running assembly 12.

The variable arm 33 of the rocker lever 30 is slidingly engaged for this purpose in a passage 43 of the drum piece 36 and the latter is mounted for rotation on a second slider 44 which is guided in the direction D2 by chassis elements 10 forming bearings and is linked by a cable 45 to the speed control 22, this sliding and rotating fitting constituting the supplementary engagement means provided between the drum piece 36 and the variable arm 33 of the rocker lever 30, it being understood that other technically equivalent supplementary engagement means can be utilized (for example the drum piece 36 can be of round iron carried transversely by the slider 44 and engaged in a slot formed for this purpose longitudinally in the variable arm 33 of the rocker lever 30.

The cam 35 is keyed directly on the steering spindle 15.

The coupling connection 26 thus produced introduces a transmission ratio K between the speed control lever 22, which is the input control, and the speed control cable 25 which is the output control, and this transmission ratio K is variable by virtue of the fact that the rocker lever 30 is subjected to the cam 35.

In straight-ahead travel, as represented in FIG. 2, the transmission ratio K is equal to $D/d$, D being the projection of the constant arm 32 of the rocker lever 30 upon the median rest position, as defined above, and $d$ being the projection of the variable arm 33 of the said rocker lever upon this same rest position.

For the median rest position represented in solid lines in FIG. 2, the projections in question obviously coincide with the corresponding arms of the rocker lever 30, but they appear better when, under the action of the input speed control 22, this rocker lever pivots about its pivot 31, as indicated diagrammatically in broken lines in FIG. 2.

By reason of the guidance of the slider 44 the length $d$ is constant, whatever is the pivoting of the rocker lever 30; in practice, as the slider 44 is tangential to the directing profile 39 of the cam 35, this length $d$ is equal to the diameter of this directing profile.

If one neglects the lateral deviation of the end of the arm 32 of the rocker lever on pivoting of the latter, the length D as defined above is likewise constant; so that this length D may be strictly constant it is moreover sufficient to provide supplementary engagement means between the arm 32 of the rocker lever 30 and a drum piece linked to the output speed control 25, in accordance with features analogous with those described for the arm 33 of this rocker lever and the drum 36 associated with it.

Thus the straight-ahead transmission ratio K is well determined by the lengths $d$ and D, and these are selected by design in such manner that the linear speeds V1, V2, $v$ of the driving running elements of the vehicle, as defined above are equal, which ensures the desired coherence in this respect.

Now it will be supposed that a steering angle A is imposed upon the motor-director assembly 14, as represented in FIG. 3.

In this case the cam 35 pivots by an equal angle about its rotation axis B, which involves displacement of the slider 34 carrying the pivot 31 of the rocker lever 30; the projection of the constant arm 32 of the rocker lever remains equal to D, while that of its variable arm 33 becomes equal to $d \cos A$.

As a result the transmission ratio K ensured by the coupling connection 26 becomes:

$$K = \frac{D}{d \cos A}. \quad (II)$$

By a comparison of this relationship (II) with the relationship (I) mentioned above, it appears that the speed control of the motor-director running assembly 14 is in fact effected in coherent manner with the speed control of the driving running assembly whatever is the steering of the motor-director running assembly 14.

It has been assumed above that in a manner known per se a single pump 18 is provided to supply the hydraulic motors 19D, 19G, respectively coupled to the two driving running elements 11D, 11G of the driving running assembly 12, the output of which single pump is regulated by a control lever linked to the speed control lever 22.

By way of variant, and in a manner likewise known per se individual pumps can be provided to supply the motors 19D, 19G independently of one another.

In this case the speed control associated with the driving running assembly 14 is advantageously of the type as described in French Pat. No. 1,573,169.

Such a speed control system will not be described in detail here.

It is sufficient to recall that the control levers associated with the pumps supplying the motors 19D, 19G are then intercoupled by a rocker lever which is linked to the drive change lever 22 forming the associated speed control, and which is mounted for sliding under the control of the steering control, which can be a hand wheel control system of ordinary type.

FIGS. 4 and 5 illustrate a form of embodiment of the coupling connection 26 as described above.

In these Figures the same references have been adopted as above to designate the same elements.

Briefly, for its sliding the slider 34 is mounted for movement axially in two bearings 50 with interposition for example of friction bearings of synthetic material.

The guide lug 38 which this slider 34 carries bears upon the cam profile 37 through the intermediary of a rolling bearing 55.

The slider 44 carries a swivel joint 52 the external element of which is keyed on this slider and the internal element of which, which forms the equivalent of the drum piece 36, axially has a passage in which the rocker lever 30 is slidingly engaged (constructional detail not visible in the Figures).

In all cases the various connection cables are preferably of the "Teleforce" type, that is to say they are surrounded by sheets which are abutted at their ends for concomitant traction and compression work.

Figure 6:
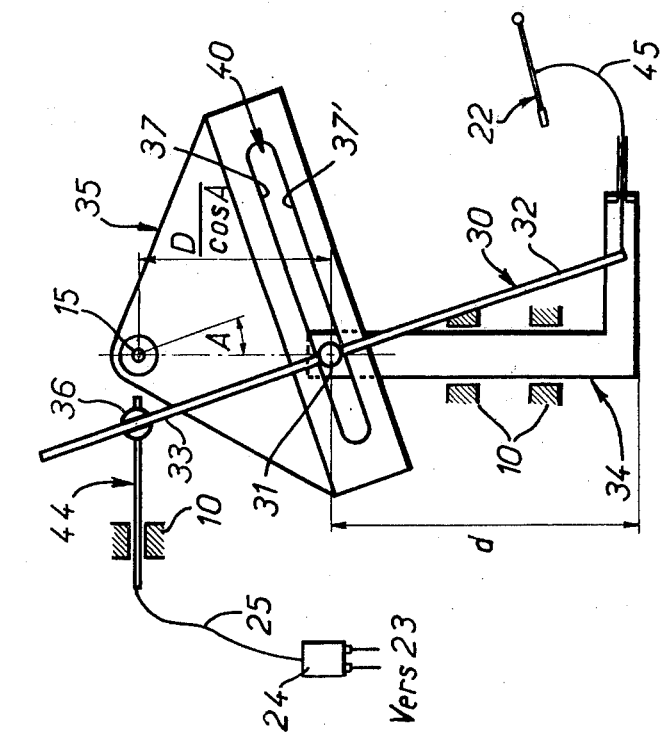
FIG. 6 is a view analogous with that of FIG. 3, on a different scale and concerns a variant of embodiment obtained by inversion, as indicated above.

FIG. 6 illustrates a variant of embodiment according to which the cam profile 37 of the cam 35 is a straight line segment established at a distance from the rotation axis B of the cam, the corresponding profile being obtained by geometric inversion of the director circle 39 of the previous form of embodiment in relation to the point B of this circle which precisely constitutes the rotation axis of the cam.

In this case, the constant arm 32 of the rocker lever 30 constitutes its input element, this arm being linked by the cable 45 to the speed control 22 of the driving running assembly 12.

The variable arm 33 of the rocker lever 30 constitutes its output element, this arm being linked to the cable 25 constituting the speed control of the motor-director running assembly.

The projection of the constant arm 32 of the rocker lever 30 upon the median rest position of the latter has the value d.

The projection of the variable arm 33 of the rocker lever 30 upon the median rest position of the latter has the value D when in the straight-ahead position and $D/\cos A$ in turning.

Of course the present invention is not limited to the forms of embodiment as described and represented, but covers any variant of embodiment and/or of combination of their various elements.

In particular each running element of the driving running assembly 12 can be single and consist for example of a roller or a wheel, or can be associated with one or more other running elements of this type disposed coaxially one beside the other.

The same applies to the running element of the motor-director running assembly 14.

Finally and as will have been understood, only certain chassis elements 10 have been represented in hatched lines in FIGS 2, 3 and 6, it being unnecessary to describe them in detail.

I claim:

1. A hydrostatic transmission vehicle of the kind which bears upon the ground by means of at least two longitudinally staggered running assemblies, one of said running assemblies, hereinafter called the driving running assembly being speed controllable by a speed control system, while another of the said running assemblies, hereinafter called the motor-director running assembly, is mounted for pivoting as a whole about a steering spindle under the action of a direction control system the said motor-director running assembly also being speed controllable by means of a speed control said speed control of the motor-director running assembly being coupled with said speed control of the driving running assembly, the said coupling connection comprising a rocker lever mounted for pivoting and having on each side of its pivot;
   a. a first arm hereinafter called the constant arm, by which said coupling connection is linked to any one of the said speed controls, the projection of the said constant arm on a median rest position corresponding to straight-ahead travel of the vehicle being substantially constant; and
   b. a second arm hereinafter called the variable arm by which said coupling connection is linked to the other of the said speed controls, the projection of the said variable arm upon the said median rest position being variable under the action of the direction control system.

2. The vehicle according to claim 1, in which the pivot of said rocker lever is carried by a slider mounted for movement in a first direction under the control of a cam and in which said variable arm cooperates, through the intermediary of supplementary engagement means, with a drum piece linked to said corresponding speed control and guided in displacement in a second direction perpendicular to the first direction the said cam, which is mounted for rotation about an axis perpendicular to the two said directions at the point of intersection thereof, being keyed in rotation on the direction control and having a cam profile in contact with which a guide lug fast with the said slider and coaxial with the pivot of the rocker lever thereon is held applied.

3. The vehicle according to claim 2, in which said profile of the cam is a circle passing through the axis of rotation thereof, said constant arm of the rocker lever being linked to the speed control of the said motor-director running assembly and the said variable arm being linked to the speed control of the driving running assembly.

4. The vehicle according to claim 2, in which said cam profile of the cam is a straight-line segment established at a distance from the axis of rotation thereof, said constant arm of the rocker lever being linked to the speed control of the driving running assembly and the said variable arm being linked to the speed control of the motor-director running assembly.

5. The vehicle according to claim 2 in which the said profile of the cam is formed by one of the flanks of a slot which said cam possesses, the said guide lug of the rocker lever being engaged in said slot, the other flank of said slot providing the means to hold said guide lug applied against the said cam profile.

6. The vehicle according to claim 2 in which the said drum piece, which cooperates through the intermediary of supplementary engagement means with said variable arm of the rocker lever, is carried by a slider mounted for movement in the second direction under consideration.

7. The vehicle according to claim 1 in which said constant arm of the rocker lever is linked to the corresponding speed control by a cable surrounded by a sheath, the latter being counter-abutted by a lateral arm which the said slider carrying the said rocker lever possesses for this purpose.

8. The vehicle according to claim 1 in which said constant arm of the rocker lever is linked to the corresponding speed control through the intermediary of supplementary engagement means.

9. The vehicle according to claim 1 in which the said driving running assembly comprises two driving running elements each of the said running elements being coupled respectively to hydraulic motors supplied with fluid under pressure by a common single pump, the cylinder displacement of said pump being regulated by a control lever and the sleeve control of that driving running assembly being linked to the said control lever.

10. The vehicle according to claim 8 in which individual pumps are provided to supply motors coupled respectively with the said two driving running elements of the driving running assembly, each of said pumps having its cylinder displacement regulatable by a control lever and the corresponding control levers being coupled with one another by a rocker lever to which the speed control of the said driving running assembly is linked and which is mounted on a slider, the slider being mounted for sliding under the control of the said direction control system.

* * * * *